(12) United States Patent
Umeda et al.

(10) Patent No.: US 9,582,232 B2
(45) Date of Patent: Feb. 28, 2017

(54) INFORMATION PROCESSING APPARATUS, PROCESSING METHOD, AND STORAGE MEDIUM FOR BUILDING A PRINT APPLICATION USING A HYBRID APPLICATION

(71) Applicant: CANON KABUSHIKI KAISHA, Tokyo (JP)

(72) Inventors: Kiyoshi Umeda, Kawasaki (JP); Naoki Sumi, Kawasaki (JP); Tomohiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/743,487

(22) Filed: Jun. 18, 2015

(65) Prior Publication Data
US 2015/0379381 A1 Dec. 31, 2015

(30) Foreign Application Priority Data
Jun. 30, 2014 (JP) .................. 2014-135178

(51) Int. Cl.
G06F 3/12 (2006.01)
G06F 9/00 (2006.01)

(52) U.S. Cl.
CPC ........... *G06F 3/1292* (2013.01); *G06F 3/1208* (2013.01); *G06F 3/1247* (2013.01); *G06F 9/00* (2013.01)

(58) Field of Classification Search
CPC ........ G06F 3/1298; G06F 3/1297; G06F 9/54; G06F 9/45504; G06K 15/1813
(Continued)

(56) References Cited

U.S. PATENT DOCUMENTS 8,045,795 B2 10/2011 Umeda ................. 382/167
8,374,439 B2 2/2013 Hori .................... 382/218
(Continued)

FOREIGN PATENT DOCUMENTS

JP 2006-350557 A 12/2006
JP 2010-010938 A 1/2010
(Continued)

OTHER PUBLICATIONS

T. Suzuki, U.S. Appl. No. 14/727,182, filed Jun. 1, 2015.
(Continued)

*Primary Examiner* — Jamares Q Washington
(74) *Attorney, Agent, or Firm* — Fitzpatrick, Cella, Harper & Scinto

(57) ABSTRACT

An embodiment of this invention solves a problem that when a print application is built using the configuration of a hybrid application, and print content is described in SVG, pixel values as a rendering result cannot be obtained. According to the embodiment, a processor of an information processing apparatus executes a program including a first program layer with an instruction set to be interpreted and executed by the processor and a second program layer with an instruction set interpreted in advance by a unit other than the processor in the following way. That is, content described in a first description language is converted into content in a second description language in the first program layer. The content is drawn by interpreting the second description language, and data of the interpreted and drawn content is obtained.

19 Claims, 13 Drawing Sheets

(58) Field of Classification Search
USPC ... 358/1.15, 1.16, 1.18; 712/32, 247; 717/115, 120, 139, 140; 719/329, 312
See application file for complete search history.

(56) References Cited

U.S. PATENT DOCUMENTS

| | | | | |
|---|---|---|---|---|
| 9,055,263 | B2 | 6/2015 | Umeda et al. ............... 382/167 |
| 2004/0051893 | A1* | 3/2004 | Yoshida ............... G06K 15/02 |
| | | | | 358/1.11 |
| 2004/0105102 | A1* | 6/2004 | Tomomatsu ......... G06K 15/00 |
| | | | | 358/1.1 |
| 2007/0192818 | A1* | 8/2007 | Bourges-Sevenier H04L 12/2803 |
| | | | | 725/132 |
| 2008/0250311 | A1* | 10/2008 | Mitsufuji ............ G06F 17/2247 |
| | | | | 715/273 |
| 2009/0180133 | A1* | 7/2009 | Yamamoto ........... G06F 3/1203 |
| | | | | 358/1.13 |

FOREIGN PATENT DOCUMENTS

| | | |
|---|---|---|
| JP | 2010-278708 A | 12/2010 |
| JP | 2013-080470 A | 5/2013 |

OTHER PUBLICATIONS

K. Umeda, U.S. Appl. No. 14/728,265, filed Jun. 2, 2015.
N. Sumi, U.S. Appl. No. 14/743,459, filed Jun. 18, 2015.
M. Kurokawa, U.S. Appl. No. 14/722,452, filed May 27, 2015.
M. Obayashi, U.S. Appl. No. 14/741,973, filed Jun. 17, 2015.
F. Goto, U.S. Appl. No. 14/740,678, filed Jun. 16, 2015.
H. Kunieda, U.S. Appl. No. 14/740,752, filed Jun. 16, 2015.
Y. Mizoguchi, U.S. Appl. No. 14/741,958, filed Jun. 17, 2015.
M. Kato, U.S. Appl. No. 14/730,985, filed Jun. 4, 2015.

* cited by examiner

INFORMATION PROCESSING APPARATUS, PROCESSING METHOD, AND STORAGE MEDIUM FOR BUILDING A PRINT APPLICATION USING A HYBRID APPLICATION

BACKGROUND OF THE INVENTION

Field of the Invention

The present invention relates to processing executed by an information processing apparatus such as a mobile terminal that operates as an external device for an image output apparatus, for example, a printer.

Description of the Related Art

In recent years, multi-function mobile terminals (to be referred to as mobile computers hereinafter) incorporating a camera function have explosively become widespread, and far surpass digital cameras and conventional personal computers (to be referred to as PCs hereinafter) in sales.

Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler interpretable by the CPU of the computer. Thus, the ordinary native application has an advantage that it is possible to perform an operation at high speed since the CPU directly interprets instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

Recently, various kinds of OSs are used as the mobile computers have become widespread. Hence, an important challenge in software development is how to develop applications that operate on the OSs in a short time and offer them to users speedily.

To solve this problem, a method called cross development is used. Cross development is a method of developing most part of an application using a common program language usable across various OSs. Because of use of the common program language, this method can largely decrease the number of man-hours in development as compared to a case where applications are developed individually for the OSs, and is known as an effective application development method.

Hence, the Web application is probably a method of solving the above-described problem. However, the Web application operates on the browser and cannot therefore be distributed from application stores run by vendors as a native application. For this reason, many developers desire a cross development method in a native application style that can be distributed from the stores.

As one of cross development methods capable of store distribution, a hybrid application as described in Japanese Patent Laid-Open No. 2013-080470 has received attention. In the hybrid application, the application itself is distributed to users as the above-described native application. All or most of user interfaces (UIs) in the hybrid application are described in a so-called Web standard language such as HTML5, CSS, or JavaScript. That is, one application includes a native layer and a script layer using a Web standard language. When such a configuration is employed, it is possible to develop software that makes use of both the advantage of the native application and that of the Web application.

However, when applying the above-described hybrid application to a print application to print a photo or document, the following problems arise.

In a normal hybrid application, a UI portion is described in a Web standard language and held in the application as text data. This text data is called a script. This script is input to an engine used by the OS to interpret and execute held scripts when the application is activated. As a result, the UI is displayed on the screen of the mobile computer so as to be operable by the user. Here, this engine is called an interpreter.

In a photo print application, for example, a print target photo is drawn on the UI. The software needs to be designed and developed so as to allow the user to superimpose date information such as a shooting date/time and a stamp such as a pictorial symbol on the photo and print the result. In the hybrid application, drawing of print content such as date information and a stamp is also described using the Web standard language. One of the candidates is SVG (Scalable Vector Graphics). The following is a simple example of image drawing by SVG.

```
<?xml version="1.0" standalone="no" ?>
<!DOCTYPE svg PUBLIC "-//W3C//DTD SVG 20010904//EN"
"http://www.w3.org/TR/2001/REC-SVG-
20010904/DTD/svg10.dtd">
<svg width="12cm" height="12cm"
xmlns="http://www.w3.org/2000/svg"
xmlns:xlink="http://www.w3.org/1999/xlink">
<image id="img01" xlink:href="IMG_0001.JPG" x="48"
y="33" width="215" height="148"/>
<image id="img02" xlink:href ="IMG_0002.JPG" x="272"
y="33" width="216" height="148"/>
</svg>
```

In the above example, two images having predetermined sizes (widths and heights) are drawn at predetermined positions (x, y) in predetermined regions (12 cm square), respectively. Note that in the above example, a description of a portion to include an SVG script in HTML5 is omitted.

To render print content described in SVG, it needs to be converted into image data (so-called bitmap data) generally having a high resolution, which is requested by the print engine of the printer. This processing is called rendering processing.

Since the display state and the print state of print content are normally desirably completely identical, interpretation and rendering of the content are desirably performed by the same interpreter. To print, the print content is rendered using the interpreter, and image data of the rendering result is obtained and transmitted to the printer in a predetermined format.

However, the following problems arise when executing the processing.

In a case where print content described in SVG is rendered using an interpreter held by the OS, as described above, the image can be displayed, but image data corresponding to the image cannot be obtained. At present, in a case where an interpreter held by each OS generates image data from a rendering result of SVG, the image data is used only for display.

Hence, conventionally, even though an interpreter held by an OS renders print content described in SVG, the image cannot be printed by a printer. As a result, it may be impossible to print using the form of the above-described hybrid application.

SUMMARY OF THE INVENTION

Accordingly, the present invention is conceived as a response to the above-described disadvantages of the conventional art.

For example, an information processing apparatus, a processing method, and a storage medium according to this invention are capable of building, for example, a print application using a hybrid application and executing it.

According to one aspect of the present invention, there is provided an information processing apparatus for executing, by a processor, a program including a first program layer with an instruction set to be interpreted and executed by the processor and a second program layer with an instruction set interpreted in advance by a unit other than the processor, comprising: a conversion unit configured to convert content described in a first description language into content in a second description language in the first program layer; and an obtaining unit configured to obtain data of the content obtained by drawing the converted content in the second description language.

According to another aspect of the present invention, there is provided a processing method of an information processing apparatus for executing, by a processor, a program including a first program layer with an instruction set to be interpreted and executed by the processor and a second program layer with an instruction set interpreted in advance by a unit other than the processor, comprising: converting content described in a first description language into content in a second description language in the first program layer; and obtaining data of the content obtained by drawing the converted content in the second description language.

According to still another aspect of the present invention, there is provided a non-transitory computer readable storage medium which stores a computer program to be executed in a processor of an information processing apparatus, wherein the program includes a first program layer with an instruction set to be interpreted and executed by the processor and a second program layer with an instruction set interpreted in advance by a unit other than the processor, and the program converts content described in a first description language into content in a second description language in the first program layer, and obtains data of the content obtained by drawing the converted content in the second description language.

The invention is particularly advantageous since, for example, a print application can be built using a software format "hybrid application". In addition, the application developer can build a print application using not only a second content description language but also a first content description language.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. Especially in the following embodiment, an arrangement in which a hybrid photo print application (to be described later) is operated on an information processing apparatus, various kinds of image processing are applied to an image selected by the user, and then the image is printed will be explained. Note that typical examples of the information processing apparatus include portable information terminals such as a portable telephone, smartphone, and tablet terminal.

<Description of Hardware Arrangement>

Figure 1:
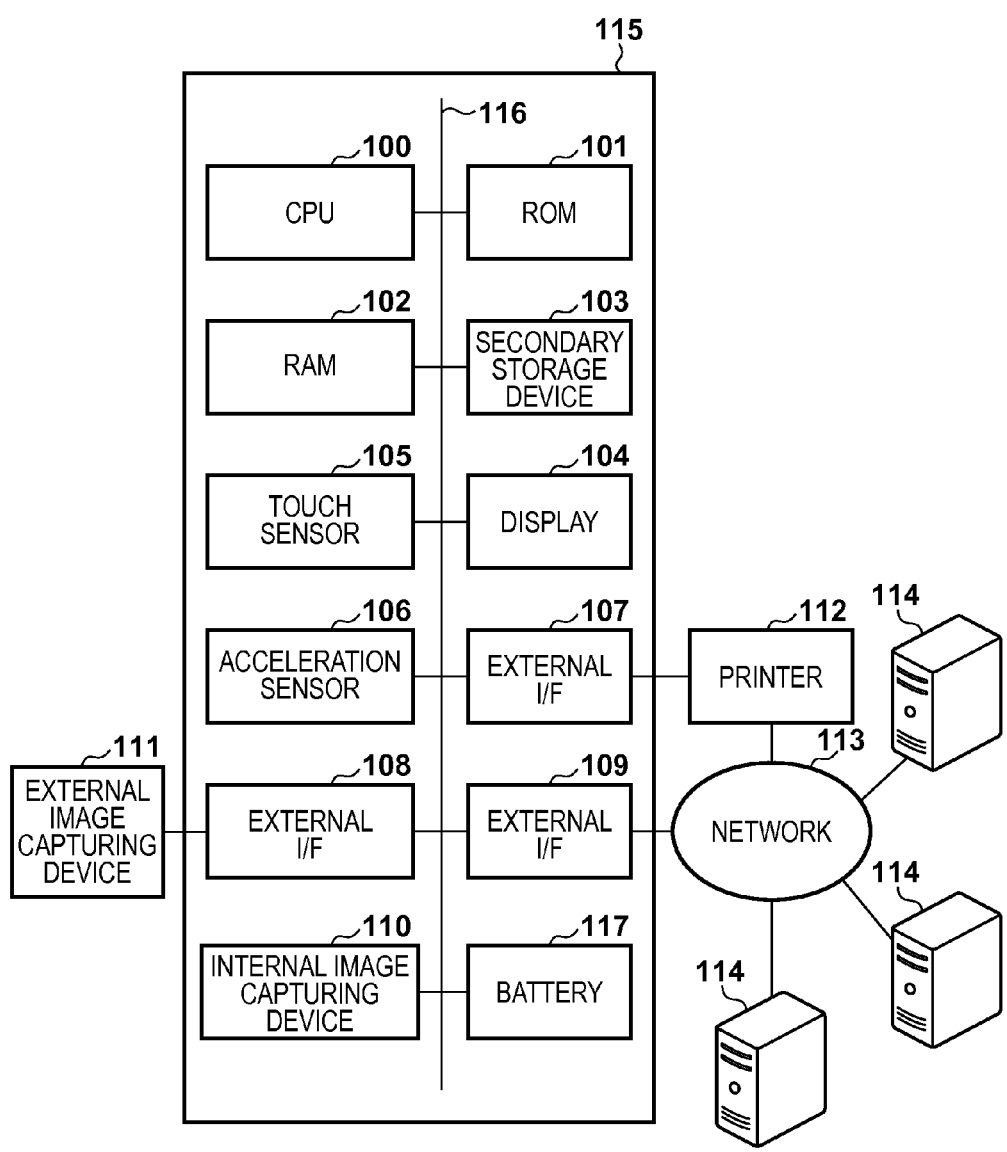
FIG. 1 is a block diagram showing the arrangement of an information processing apparatus according to an exemplary embodiment of the present invention.

FIG. 1 is a block diagram for explaining an example of the arrangement of a portable information terminal such as a smartphone or portable telephone as an information processing apparatus 115 according to an exemplary embodiment of the present invention. Referring to FIG. 1, a CPU (Central Processing Unit/Processor) 100 executes various kinds of processing (to be described below) according to a program. There is one CPU 100 in FIG. 1 but a plurality of CPUs or CPU cores may be included. A ROM 101 stores a program to be executed by the CPU 100. A RAM 102 is a memory for temporarily storing various kinds of information at the time of execution of the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of executed processing. The display 104 may include a touch sensor 105.

The information processing apparatus 115 may include an integrated image capturing device 110. Image data captured by the integrated image capturing device 110 undergoes predetermined image processing, and is then saved in the secondary storage device 103. Image data may be loaded from an external image capturing device 111 connected via an external I/F (interface) 108.

The information processing apparatus 115 includes an external I/F (interface) 109, and can perform communication via a network 113 such as the Internet. The information processing apparatus 115 can obtain, via the communication I/F 109, image data from servers 114 connected to the network 113.

The information processing apparatus 115 includes an acceleration sensor 106, and can obtain acceleration information about the position and attitude of the information processing apparatus 115 itself. The information processing apparatus 115 is connected to a printer 112 via an external I/F 107, and can output data such as image data. The printer 112 is also connected to the network 113, and can transmit/receive image data via the communication I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth®, infrared communication, or the like is used. If a wireless LAN is used for wireless communication, there are a mode in which apparatuses are directly connected to each other and a mode in which apparatuses are connected to each other via a relay unit such as a wireless LAN router. Although the external I/Fs 107 to 109 are illustrated separately in this figure, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the execution location (software execution environment) of software such as a program executed by the control unit (CPU 100) of the information processing apparatus 115.

<Block Diagram of Software>

Figure 2:
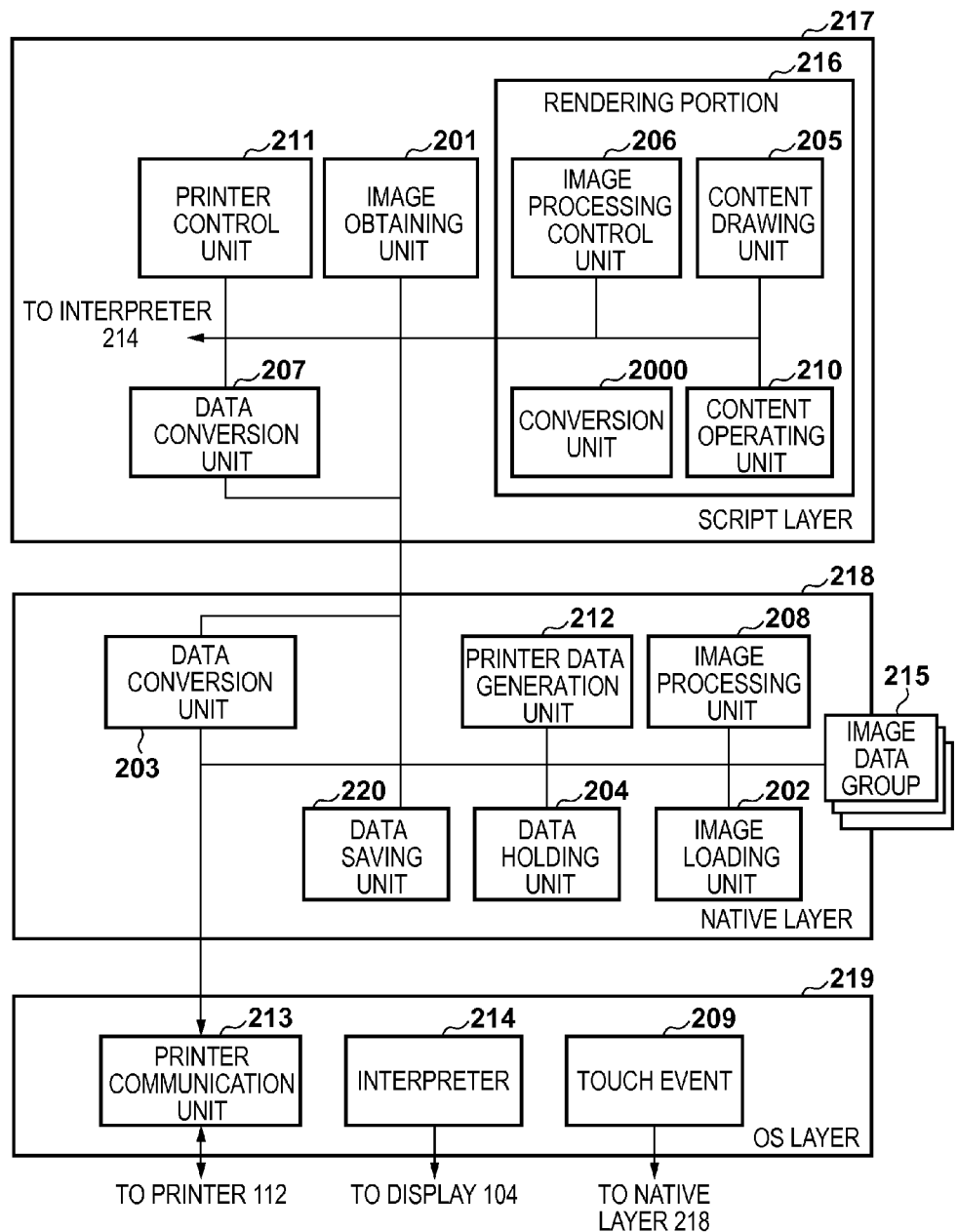
FIG. 2 is a block diagram showing the software arrangement of the information processing apparatus shown in FIG. 1.

FIG. 2 is a block diagram showing the arrangement of software programs operating on the information processing apparatus 115.

The information processing apparatus 115 executes a program of a script layer 217, native layer 218, and OS layer 219. Each layer is implemented when the CPU 100 reads out and executes the corresponding program stored in the ROM 101 or secondary storage device 103.

The script layer 217 is a program layer in which an instruction set (drawing of content, display of an image, replay of a moving image, and the like) is described by text data using a Web standard language such as HTML5, CSS3, or JavaScript®. In the script layer 217, in an application execution environment, various instruction sets of text data are interpreted and executed using a processor (for example, the CPU 100) existing in the application execution environment. In the execution form, for example, there may be a case where instruction sentences are dynamically interpreted line by line every execution operation, a case where instruction sentences are interpreted when activating an application, and a case where instruction sentences are interpreted when installing an application in the information processing apparatus 115.

Processing in the script layer 217 and its contents will be referred to as "script" hereinafter. As an example of a form in which the instructions of the script are interpreted in the information processing apparatus 115, the interpreter function included in the native layer 218 or OS layer 219 is used. Note that in this embodiment, a large portion of the UI of the application is assumed to be described in the script layer 217.

The native layer 218 is a program layer in which an instruction set interpreted (compiled) in advance in an environment other than the application execution environment is described. In the native layer 218, a code described in a high-level language such as C or C++ is compiled in advance on the server or the PC of the developer of the application into an ensemble of instructions interpretable by the CPU 100. Processing in the native layer 218 and its contents, and invocation of the function of the OS layer 219 (to be described later) from the native layer 218 will be referred to as "native" hereinafter. Note that an example of another implementation of the native layer 218 is Java. Java is a high-level language similar to C/C++, and is interpreted in advance into an intermediate code in the development environment at the time of development of the application. The interpreted intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing invocation of the native layer 218 from the script layer 217 will be referred to as "binding" or "bind". The native layer includes an API, and the various functions of the native layer can be used when the script invokes the API. In general, this binding function is normally included in each of various OSs.

Note that in this embodiment, the application including the script layer 217 and native layer 218 will be referred to as a hybrid application.

An image obtaining unit 201 of the script layer 217 requests the native layer 218 to obtain image data. At the time of the obtaining request, the image obtaining unit 201 generates a unique ID, and transmits it to the native layer 218. This ID and the image data loaded by an image loading unit 202 of the native layer 218 make a pair, and the pair is stored in a data holding unit 204 of the native layer 218. In addition, for example, a method of designating an absolute path, a method of prompting display of a dialog, or the like can be used.

The image loading unit 202 of the native layer 218 obtains the image data from an image data group 215. A method of obtaining the image data from the image data group 215 depends on the request of the image obtaining unit 201 of the script layer 217. The request method may be selected from a dialog box provided on the UI, or an image may be directly selected based on the path of a file.

A data conversion unit 203 of the native layer 218 converts data in the native layer 218 (for example, image data of a binary format) into data in a format usable in the script layer 217 (for example, image data of a text format (base64)). On the other hand, the data conversion unit 203 also converts data sent from the script layer 217 (for example, image data of a text format (base64)) into a format usable in the native layer 218 (for example, image data of a binary format).

A data conversion unit 207 of the script layer 217 converts data in the script layer 217 (e.g. a processing parameter of a text format) into data in a format usable in the native layer 218 (e.g. a processing parameter of a text format (JSON format)).

The data holding unit 204 of the native layer 218 holds the image data loaded by the image loading unit 202 and image data having undergone image processing by an image processing unit 208. The held image data is rasterized into, for example, an RGB image signal, and has a format in which it is possible to immediately execute image processing.

A content drawing unit 205 of the script layer 217 describes a content to be printed by using a Web standard language. The script operated by a content operating unit 210 is also reflected on the description. The script of the content described by the content drawing unit 205 is interpreted by an interpreter 214 of the OS layer 219, and displayed on the display 104.

An image processing control unit 206 of the script layer 217 determines a correction parameter to be used for image processing and a correction target image. These data is converted by the data conversion unit 207 into a format transmittable to the native layer 218, if required.

An image processing unit 208 of the native layer 218 performs image processing for an image designated by an image processing control unit 206. At this time, image processing to be performed is determined based on the parameter set by the image processing control unit 206. As a method of designating an image, for example, the path of the image is received from the script layer, or whole image data is received.

A touch event 209 of the OS layer 219 obtains information about a touch of the display 104. The information about a touch includes, for example, touch detection of the display 104 and touched position information. The obtained information about a touch is transmitted to the content operating unit 210 of the script layer 217 via the native layer 218.

The content operating unit 210 of the script layer 217 operates the image, for example, enlarges, moves, and rotates the image and changes the script instruction to reflect the operation.

A printer control unit 211 of the script layer 217 controls a rendering start request to a rendering unit 216, a printer detection request, display of a printer setting screen, and generation and transmission of print information. In the printer setting screen, printer settings such as a paper size, paper type, and color/monochrome are made. Printer data is generated based on the items set in the printer setting screen.

Based on the request from the printer control unit 211, a printer data generation unit 212 of the native layer 218 generates a command and data necessary for printer communication. The data necessary for printer communication is data complying with a communication protocol, and the command is data for determining the operation of the printer such as printing or scanning. Thus, the printer data generation unit 212 generates printer data including a command for determining the operation of the printer.

A printer communication unit 213 of the OS layer 219 transmits the printer data received from the printer data generation unit 212 to the connected printer 112. The interpreter 214 of the OS layer 219 interprets/executes an instruction generated in the script layer 217 and described in the Web standard language. For example, an interpretation process of an instruction of drawing an image or the like is executed by the interpreter 214 and displayed on the display 104.

The image data group 215 is an area which holds image data. A data saving unit 220 functions to save image data held in the data holding unit 204 in the image data group 215, as needed.

The rendering unit 216 controls the content drawing unit 205, image processing control unit 206, and content operating unit 210 to render the image data to be processed. This rendering operation includes, for example, causing the script layer 217 to generate an image having an output resolution to the printer 112. At this time, neither the rendering result in the script layer 217 nor the image currently generated by the script layer 217 is displayed on the display 104. The rendering result is transmitted to the data conversion unit 203 of the native layer 218, and converted into image data in a format usable by the printer 112. Moreover, the rendering unit 216 includes a conversion unit 2000 for converting content described in a SVG format into content of a Canvas format.

<Processing Associated with User Operation>

Figure 3:
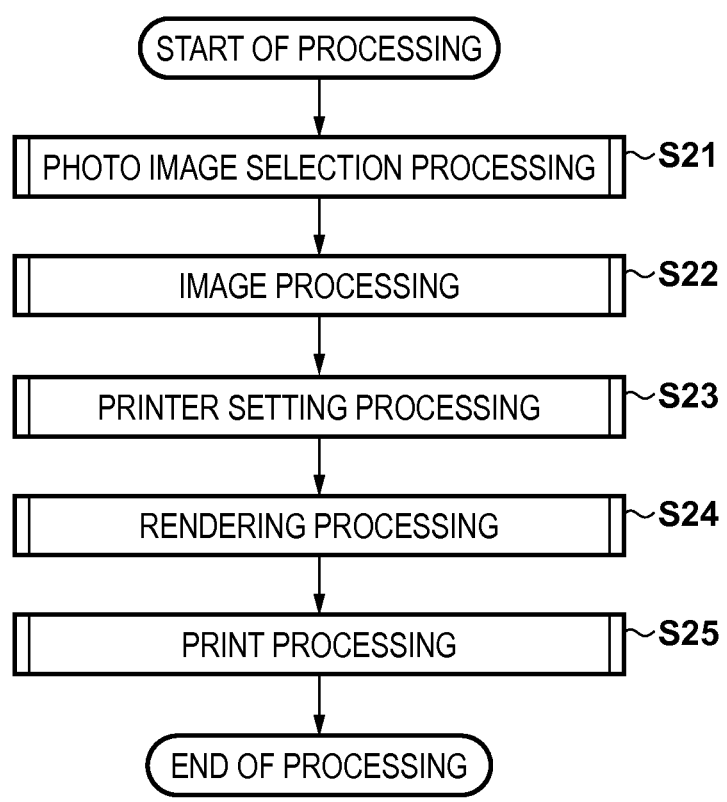
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. Note that the process of each step shown in the flowchart of the present application is implemented when the CPU 100 of the information processing apparatus 115 executes a program stored in the ROM 101 or secondary storage device 103. Each step shown in FIG. 3 moves according to a user operation on an application screen 907 as a UI shown in FIG. 9. This application screen 907 is generated by the script layer 217. An operation on the application screen 907 is implemented via, for example, the touch sensor 105.

In step S21, upon detecting a user operation (including a touch operation input, the same shall apply hereinafter) on a photo image selection button 901 of the application screen 907, the CPU 100 selects a desired image in accordance with the operation. After the image is selected, the CPU 100 displays the selected image on an entire drawing area 906 of the application screen 907.

In step S22, upon detecting a user operation on a slide bar 902 for adjusting the brightness of the displayed image, the CPU 100 sets a correction parameter to be used for image processing in accordance with the user operation. The CPU 100 performs the image processing for the displayed image according to the set correction parameter, and displays processing contents and a processing result in the drawing area 906.

In step S23, upon detecting a user operation on a print button 905, the CPU 100 displays a setting screen 1001 (FIG. 10) for setting information necessary for printing. The information necessary for printing includes, for example, a paper size, paper type, print quality, bordered/borderless setting item, as shown in the setting screen 1001 of FIG. 10. In addition, settable setting items such as double-sided/single-sided and monochrome/color are provided depending on the functions of the printer to be used.

In step S24, upon detecting a user operation on a setting completion button 1002 of the setting screen 1001, the CPU 100 executes rendering to convert the image displayed in the drawing area 906 into a print resolution for output to the printer.

In step S25, the CPU 100 transmits the image converted into the print resolution to the printer 112 together with a printer control command. With the above-described process, the image selected by the user is printed by the printer 112.

Note that the processing shown in FIG. 3 is merely an example. Processing contents are not limited to them, and the processing order of the steps is not limited to this. In this embodiment, the first program layer including an instruction set to be interpreted and executed by the processor is defined as the script layer 217, and the second program layer including an instruction set compiled in advance by a unit other than the processor is defined as the native layer 218. A program including the first program layer and the second program layer implements a hybrid application. Character string data is defined as the first format and binary data is defined as the second format. Note that the script layer 217 is able to hold data of a text format, and the native layer 218 is able to hold data of a binary format.

<Selection of Printer>

First, when an application for implementing the processing shown in FIG. 3 is activated by a user operation, the application performs discovery processing (not shown) of a connectable external device (the printer 112). The discovery processing indicates processing of specifying the IP address of the connectable printer 112 in the network 113 in which the information processing apparatus 115 exists.

The information processing apparatus 115 can transmit an instruction to obtain attribute information of various printers to the IP address (in some cases, a plurality of IP addresses) obtained by the discovery processing, and obtains a reply.

More specifically, in the native layer 218, the information processing apparatus 115 generates a command for obtaining information of each printer. The command is an instruction to designate the operation of the printer, and expressed in XML given by:

```
<?xml version="1.0" encoding="utf-8" ?>
<cmd xmlns:trans="http://www.trans/example/">
    <contents>
        <operation>GetInformation</operation>
    </contents>
</cmd>
```

The generated command is broadcast to network devices (for example, routers connected by Wi-Fi®) on the network in a format complying with the communication protocol of the printer. The communication method may be a Wi-Fi Direct mode or a mode of using a telephone line. The present invention, however, is not limited to them. As a result of transmitting the command, the native layer 218 receives a response from the printer. The received response is exemplarily expressed in XML given by:

```
<?xml version="1.0" encoding="utf-8" ?>
<cmd xmlns:trans="http://www.trans/example/">
    <contents>
        <PrinterName>PrinterA</PrinterName>
        <ImageProcGrp>A</ImageProcGrp>
        <ResolutionX>400</ResolutionX>
        <ResolutionY>400</ResolutionY>
    </contents>
</cmd>
```

Figure 12:
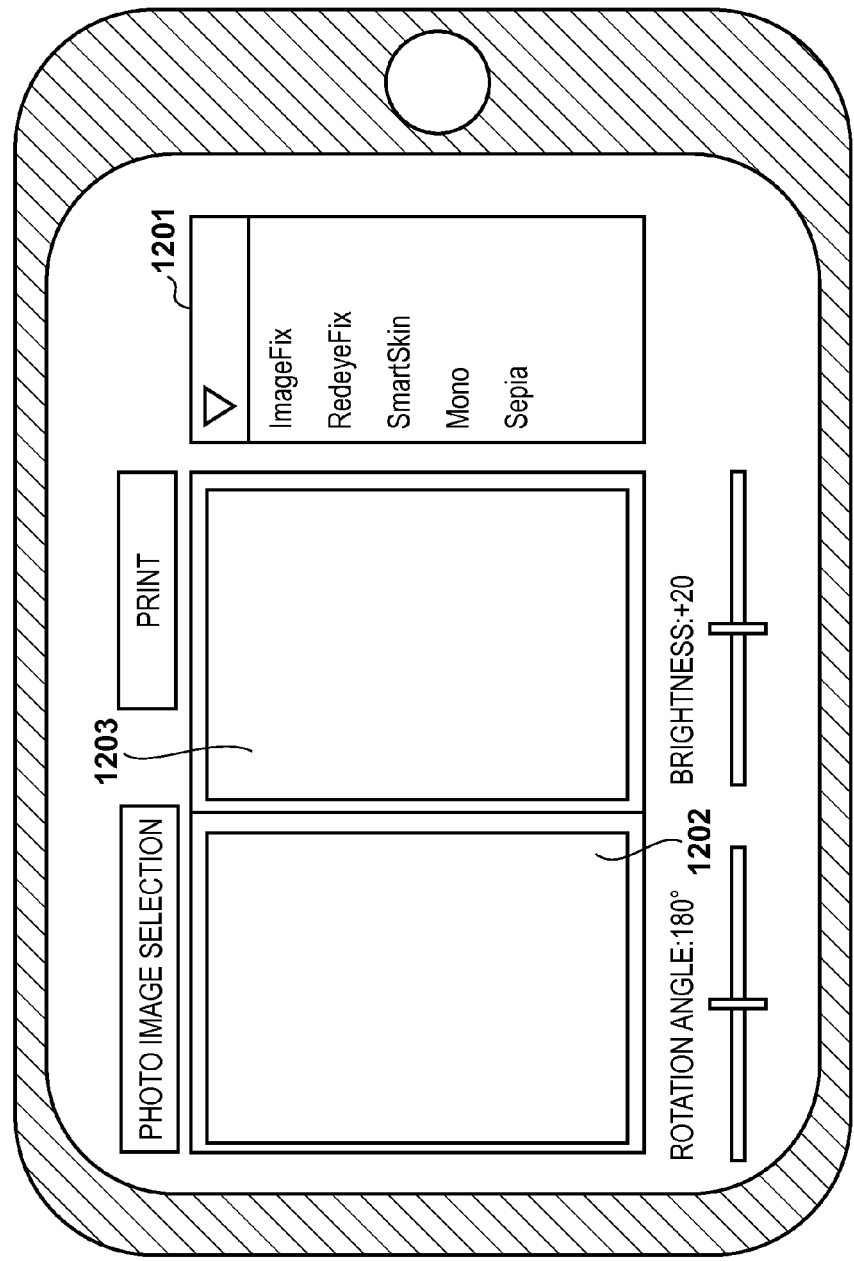
FIG. 12 is a view showing an example of an image processing function selection screen.

The simple example is shown above. By using the PrinterName tag, a printer name can be obtained. In addition, an image processing group usable by each printer can be obtained by an ImageProcGrp tag. Options to be displayed in a pull-down menu 1201 shown in FIG. 12 are determined by the image processing group. ResolutionX and ResolutionY are image resolutions required by the engine of the printer. The unit is, for example, dpi.

A model name obtained in the native layer 218 can be transmitted to the script layer 217 and displayed in a list of printers by a virtual code given by:

```
<form name="frmPrinter">
    <select name="selPrinter">
    </select>
</form>
<script type="text/javascript">
    Function fAddPrinter(PrinterName, count){
        var sObj=document.forms["frmPrinter"].elements["selPrinter"];
        for (var i=0; i<count; i++){
            var idx=sObj.length;
            sObj.options[idx]=new Option(PrinterName[i]);
        }
    }
</script>
```

The select tag is a description for displaying the list. The JavaScript code described in the script tag allows addition of obtained printer names (which are stored as the PrinterName array) to the list.

Figure 11:
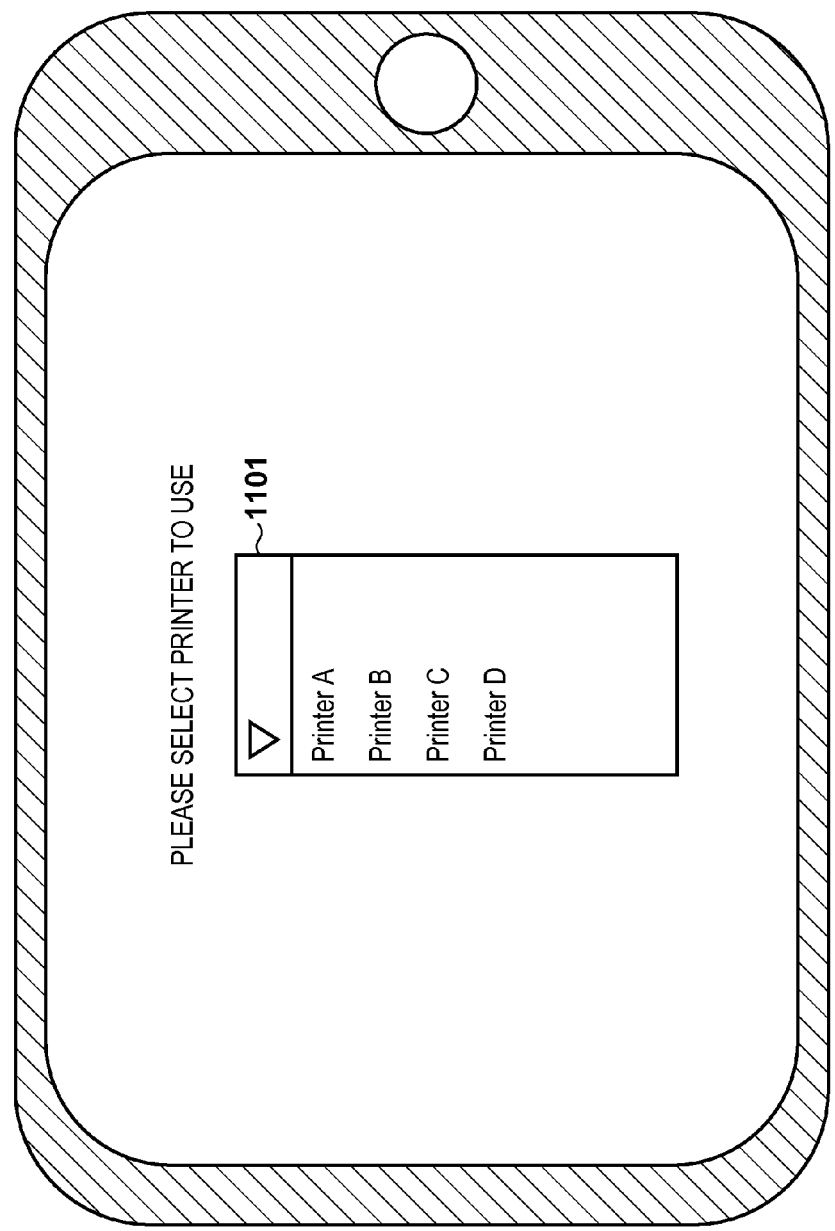
FIG. 11 is a view showing an example of a printer selection screen.

FIG. 11 shows a pull-down menu 1101 including the list of printers which is displayed on the display 104 by interpreting, by the interpreter 214, the virtual code generated in the script layer 217. When the user selects his/her intended printer, the script layer 217 can obtain an ID indicating the ordinal number of the list. After selecting the printer, the user moves to an operation of selecting a photo image.

<Details of Photo Image Selection Processing and its Image Processing>

Next, photo image selection and its image processing which are performed in the above-described information processing apparatus will be described. Thus, in this case, the information processing apparatus 115 functions as an image processing apparatus.

Figure 4:
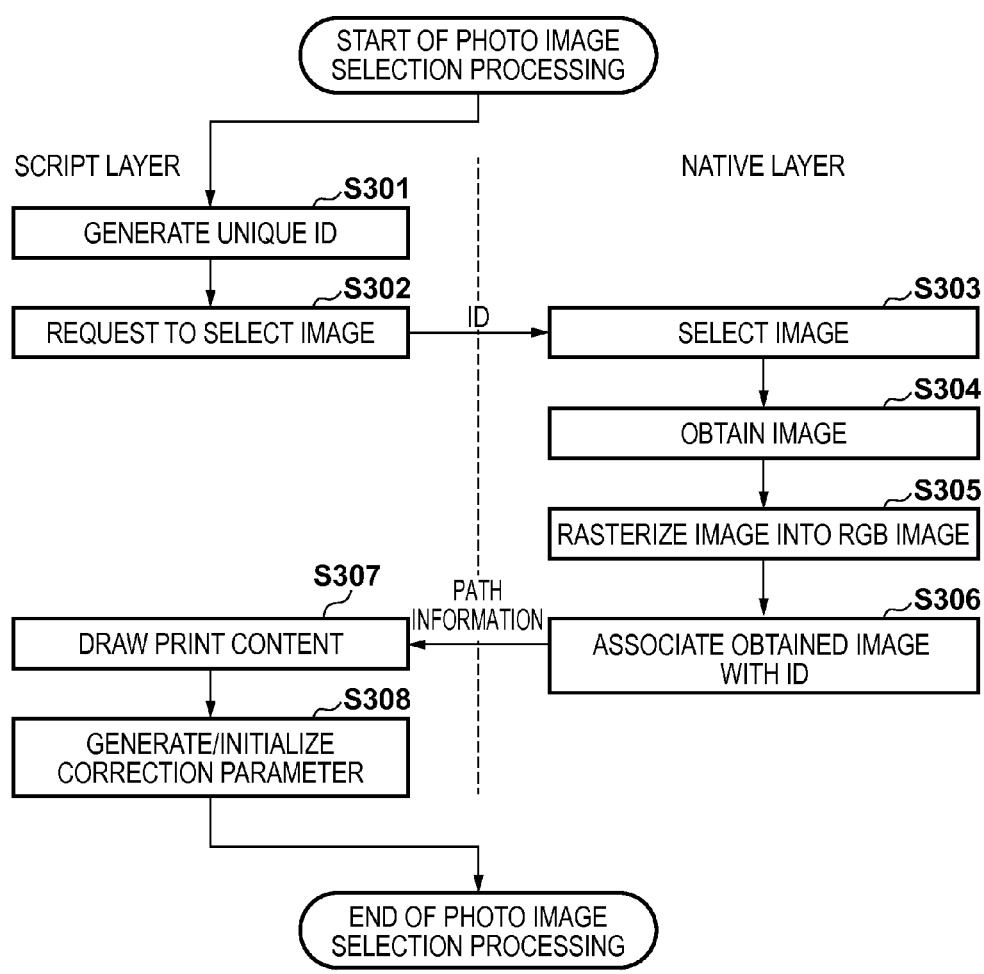
FIG. 4 is a flowchart illustrating details of photo image selection processing.
Figure 9:
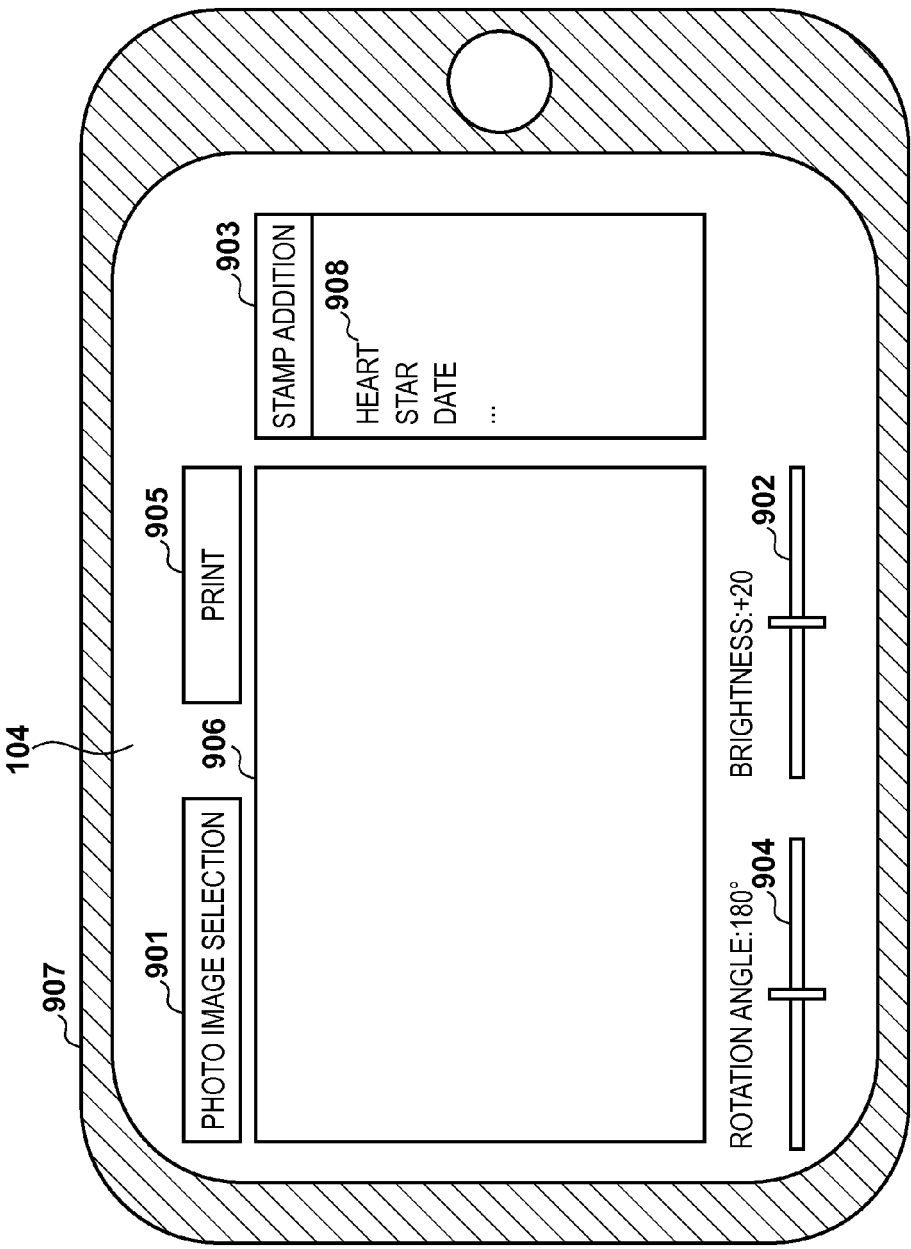
FIG. 9 is a view showing an example of an application screen.

When the user presses the photo image selection button 901 shown in FIG. 9, step S21 starts. Details of the photo image selection processing in step S21 of FIG. 3 will be described with reference to FIG. 4. Note that steps S301 to S302 and S307 to S309 are processes executed by the CPU using the program of the script layer, and steps S303 to S306 are processes executed by the CPU using the program of the native layer.

In step S301, the CPU 100 generates a unique ID. This ID may have any form such as a numerical value or character string as long as it can be transmitted from the script layer 217 to the native layer 218. In step S302, the CPU 100 requests the native layer 218 to select an image in accordance with a user operation on the photo image selection button 1201. In step S302, the ID generated in step S301 is also transmitted to the native layer 218. As a request method, the binding function is used to directly invoke an image selection API unique to the native layer 218 from the script layer 217. However, if the image selection API unique to the native layer cannot directly be invoked, a function capable of being directly invoked from the script layer 217 is prepared in the native layer 218, and a function for invoking the image selection API unique to the native layer is described in the function. This is a method of preparing a wrapper in advance. The API has a mechanism in which the above ID is transferred, for example, as an argument. In this way, the ID is transferred to the native layer 218.

In step S303, the CPU 100 displays a device-specific image selection UI on the display 104. Based on a user operation on the displayed image selection UI, the CPU 100 selects one desired image. In this embodiment, one image is selected from an image folder of the device. However, for example, an image on the Internet or an image in a detachable storage medium may be selected, or an image shot using the camera function of the information processing apparatus 115 may be obtained.

In step S304, the CPU 100 obtains the selected image. In step S305, the CPU 100 rasterizes the obtained image in an RGB space. In step S306, the CPU 100 holds the rasterized RGB image in a storage area usable in the native layer (e.g. the data holding unit 204) in association with the ID obtained from the script layer 217. As an association method, for example, an object having the ID and RGB image is created to make it possible to specify the RGB image by the ID. An association method is not limited to this, and a path as the access destination of the ID and the selected image, a function or class to be executed in accordance with the ID and RGB rasterization, and the like can be used. Upon opening the image file, the path information (the name of a file or a location to save the image) of the image can be obtained from the OS layer 219. Hence, the path information is returned from the native layer 218 to the script layer 217 in step S306.

In step S307, the CPU 100 performs a DOM (Document Object Model) operation by known JavaScript® using the returned path information, thereby generating an SVG script to be described below. More specifically, the rendering unit of the script layer generates the following SVG script:

```
<?xml version="1.0" standalone="no" ?>
<!DOCTYPE svg PUBLIC "-//W3C//DTD SVG 20010904//EN"
"http://www.w3.org/TR/2001/REC-SVG-
20010904/DTD/svg10.dtd">
<svg width="1600" height="1200"
xmlns="http://www.w3.org/2000/svg"
xmlns:xlink="http://www.w3.org/1999/xlink">
<image id="img01" xlink:href="/images/IMG_0001.JPG"
x="10" y="10" width="780" height="1180"/>
<image id="img02" xlink:href="/images/IMG_0002.JPG"
x="810" y="10" width="780" height="1180"/>
</svg>
```

Note that in the above script, the unit of each numerical value is "pixels". In addition, "/images/IMG_000x.jpg" represents the path information of the selected image.

Figure 13:
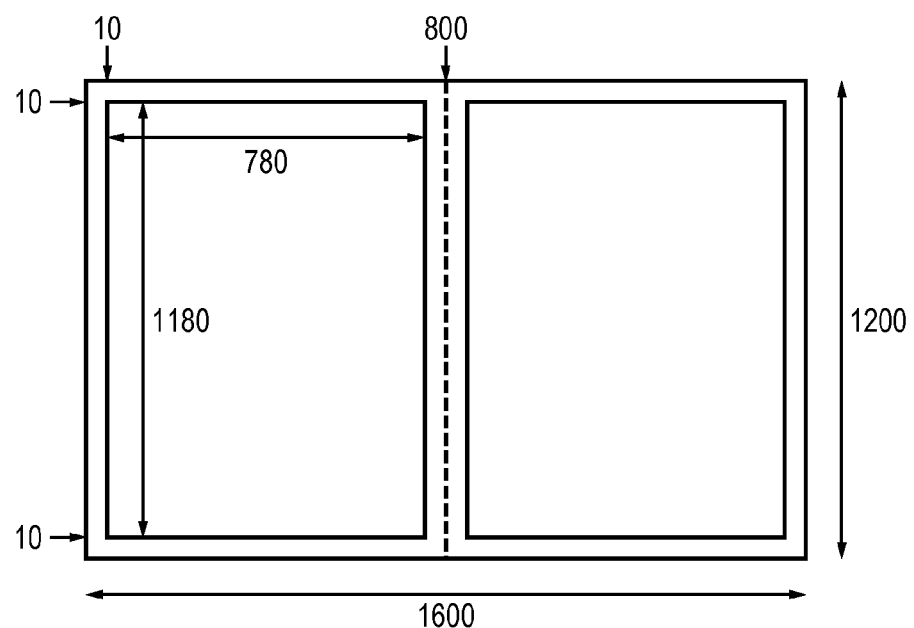
FIG. 13 is a view showing an example of print content.

FIG. 13 is a view showing an example of print content rendered by the script. In this embodiment, an example in which two selected images are thus arranged in one page is shown. However, the present invention is not limited to this. For example, images can be rendered in any arrangement, layout, or the like.

The SVG script generated in step S307 is included as inner HTML in the contents described by HTML5. The HTML script including the SVG is interpreted by the interpreter 214 shown in FIG. 2, and the image is displayed on the display 104. In step S308, the CPU 100 generates and initializes a correction parameter. The correction parameter is an object holding parameters for determining contents of the image processing in step S22. What kind of image processing is to be performed in the native layer 218 is determined by the correction parameter.

<Details of Image Processing>

Figure 5:
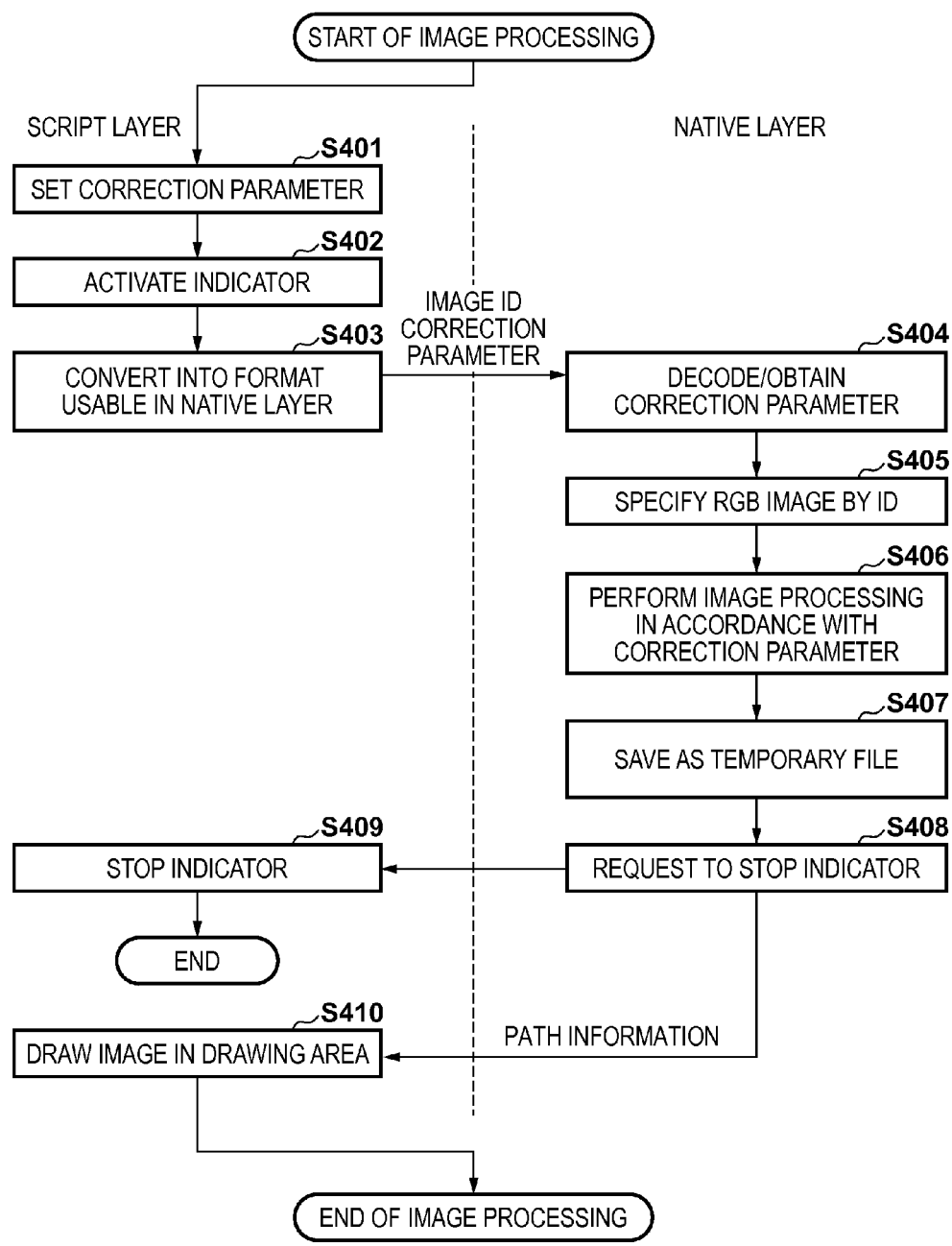
FIG. 5 is a flowchart illustrating details of image processing.

When the user changes the slide bar 902 shown in FIG. 9, step S22 starts. Details of the image processing in step S22 of FIG. 3 will be described with reference to FIG. 5. Note that steps S401 to S403, S409, and S411 are processes executed by the CPU using the program of the script layer, and steps S404 to S408 are processes executed by the CPU using the program of the native layer.

In step S401, the CPU 100 sets the correction parameter. In this example, the CPU 100 updates the value of "brightness" of the correction parameter generated in step S308 of FIG. 3 by a value set in accordance with a user operation on the slide bar 902. In step S402, the CPU 100 activates an indicator, and displays it on the display 104. The indicator is a UI display for notifying the user that some processing is internally in progress in the application. For example, the indicator is generally represented by a progress bar, a clock mark, or an image such as blink or rotation of a figure. It normally takes about several seconds to several tens of seconds to complete rendering processing. Thus, such an indicator is indispensable tool.

In step S403, the CPU 100 converts the correction parameter set in the step S401 into a JSON character string format usable in the native layer 218. In this example, the correction parameter is in the form of an object, and cannot be used intact in the native layer 218. Thus, the CPU 100 converts the set correction parameter into a JSON character string. The CPU 100 transfers the correction parameter converted into the JSON character string to the native layer 218 together with the ID generated in step S301 of FIG. 3.

In step S404, the CPU 100 decodes the correction parameter converted into the JSON character string, thereby obtaining the correction parameter. More specifically, "brightness" of the correction parameter is obtained.

In step S405, the CPU 100 specifies the RGB image rasterized in step S305 of FIG. 3 based on the ID obtained from the script layer 217.

In step S406, the CPU 100 determines image processing to be performed based on the obtained correction parameter, and performs the image processing for the RGB image.

In step S407, the CPU 100 converts the RGB image having undergone the image processing into image data in a format usable (format supportable) in the script layer 217. For example, the CPU 100 converts the above RGB image into data in the JPEG format, and saves the converted JPEG format data as a temporary file. In step S408, the CPU 100 requests the script layer 217 to stop the indicator. This is implemented by invoking an indicator stop function defined in the script layer 217 from the native layer 218.

In step S409, the CPU 100 stops the indicator, and removes the indicator displayed on the display 104.

On the other hand, in step S410, the CPU 100 obtains the path information on the saved image as the temporary file, rewrites the contents of the above-described SVG script so that the image can be displayed on the screen. This rewriting is performed by a well known DOM operation. The rewritten SVG script is finally transferred to the interpreter 214, and interpreted by the interpreter 214. The result is displayed on the display 104.

In this embodiment, as shown in FIG. 12, a list of available image processing is displayed by the pull-down menu 1201 so that a user can select his/her desired processing.

In the pull-down menu 1201, "ImageFix" indicates a function (face detection function) of automatically analyzing a photo image using a human face detection or scene analysis unit, and performing appropriate brightness/white balance adjustment (see Japanese Patent Laid-Open No. 2010-278708), "RedeyeFix" indicates a function (red eye detection function) of automatically detecting a red eye image from images and correcting it (see Japanese Patent Laid-Open No. 2006-350557), "SmartSkin" indicates a function of detecting a human face from a photo image, and desirably processing the skin region of the face (see Japanese Patent Laid-Open No. 2010-010938), "Mono" indicates a monochromatic processing function of performing a known monochrome conversion, and "Sepia" indicates a sepia processing function of performing a known sepia conversion. Note that the types of image processing functions are not limited to those shown in FIG. 12, and various kinds of image processing can be used in accordance with the application and purpose.

At this time, in this embodiment, a system function normally provided in the OS layer 219 is invoked from JavaScript by the binding function. A clock rate Clk [MHz] of the CPU 100 of the information processing apparatus 115 is obtained from the system function.

In this embodiment, an image processing group is specified based on the clock rate Clk using a predetermined threshold Th1. A virtual code to specify the image processing group is given by:

```
If (Clk > Th1) ImageProcGrp = "A";
    Else ImageProcGrp = "B"
```

Note that this determination is normally done in the script layer 217 when the application is activated.

After the image processing group can be specified, a usable image processing display script is controlled in the script layer 217 by:

```
<form name="frmIProc">
    <select name="selIProc">
    </select>
</form>
<script type="text/javascript">
    Function fAddImageProc(Grp){
        var
sObj=document.forms["frmIProc"].elements["selIProc"];
        if(Grp="A"){
            var idx=sObj.length;
            sObj.options[idx]=new Option("ImageFix");
            var idx=sObj.length;
            sObj.options[idx]=new Option("RedEyeFix");
            var idx=sObj.length;
            sObj.options[idx]=new Option("Smart Skin");
            var idx=sObj.length;
            sObj.options[idx]=new Option("Mono");
            var idx=sObj.length;
            sObj.options[idx]=new Option("Sepia");
        }
        Else if (Grp="B"){
            var idx=sObj.length;
            sObj.options[idx]=new Option("Mono");
            var idx=sObj.length;
            sObj.options[idx]=new Option("Sepia");
        }
    }
</script>
```

In the above script operation, in a case where it is determined that the clock rate of the CPU 100 of the information processing apparatus 115 is larger than a predetermined threshold value, and complex image processing is executable (Grp=A), more image processing functions can be selected. On the other hand, in a case where the clock rate of the CPU 100 is equal to or smaller than the predetermined threshold value, only a process such as monochrome conversion or sepia conversion of light processing load can be selected.

It goes without saying that the script is interpreted by the interpreter 214 held in the OS layer 219 and displayed on the screen. FIG. 12 is a view showing such a drawing.

When the user selects his/her intended image processing function, it is possible to discriminate the selected image processing ID by using an HTML function. This image processing ID is transmitted to the native layer 218, and the image processing unit 208 applies and executes image processing corresponding to the selected image processing function. Note that the detailed description of the image processing is omitted.

<Details of Printer Setting Processing>

When the user presses the print button 905 shown in FIG. 9, the process of step S23 of FIG. 3 starts. Details of the printer setting processing in step S23 of FIG. 3 will be described with reference to FIG. 6. Note that steps S601 and S607 to S609 are processes executed by the CPU 100 using the program of the script layer 217, and steps S602 to S606 and S610 are processes executed by the CPU 100 using the program of the native layer 218.

In step S601, from the script layer 217, the CPU 100 requests the native layer 218 to obtain printer information as device information. This is equivalent to a request from the script layer 217 for communicating with the printer 112. As a request method, an API unique to the native layer is invoked from the script layer by using the binding function, similarly to the image selection processing. A function capable of being directly invoked from the script layer 217 or a so-called wrapper of indirectly invoking the function is prepared in advance in the native layer 218. For example, a native function GetPrinterinfo is prepared, and invoked from the script side. In this way, the native layer obtains a request to communicate with an external device from the script layer.

In general, it is impossible to directly communicate with an external device from the script layer 217 under the security restrictions. Therefore, as described above, the script layer 217 requests the native layer 218 to obtain external device information, and then communicates with an external device via the native layer 218. The native layer 218 has a function of communicating with an external device (for example, the printer 112) via the OS layer 219.

In step S602, when the native layer 218 is invoked by the above function, the CPU 100 performs detection of a printer, so-called, discovery. In step S603, to detect a communicable printer, the CPU 100 performs broadcast or multicast by using a protocol such as Bonjour®, and detects and stores an IP address of the printer which has responded. For example, a printer connected by the same wireless LAN router is detected.

In step S604, the CPU 100 requests the IP address of the printer that has responded to provide printer information. If a plurality of printers have responded, the CPU 100 requests all printers to provide information. To do this, the CPU 100 generates, in the native layer, a command to obtain the information of each printer. The command is an instruction to designate the operation of the printer, and its example is expressed in XML given by:

---

```
01:     <?xml version="1.0" encoding="utf-8" ?>
02:     <cmd xmlns:trans="http://www.xxxx/yyyyy/">
```

-continued

```
03:            <contents>
04:                <operation>GetInformation</operation>
05:            </contents>
06:        </cmd>
```
---

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetInformation" is an instruction of obtaining information of a printer as an external device. For example, it is requested to provide capability information such as a paper type, a size, the presence/absence of a marginless printing function, and the print quality supported by the printer.

Note that a printer information obtaining command may be generated by, for example, loading permanent text stored in advance in the ROM 101. Also, the format is not limited to a text format such as XML, and the command may be described in the binary format, and communicated by a protocol complying with the format. The generated printer information obtaining command is transmitted to the printer 112 via the printer communication unit 213 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 6:
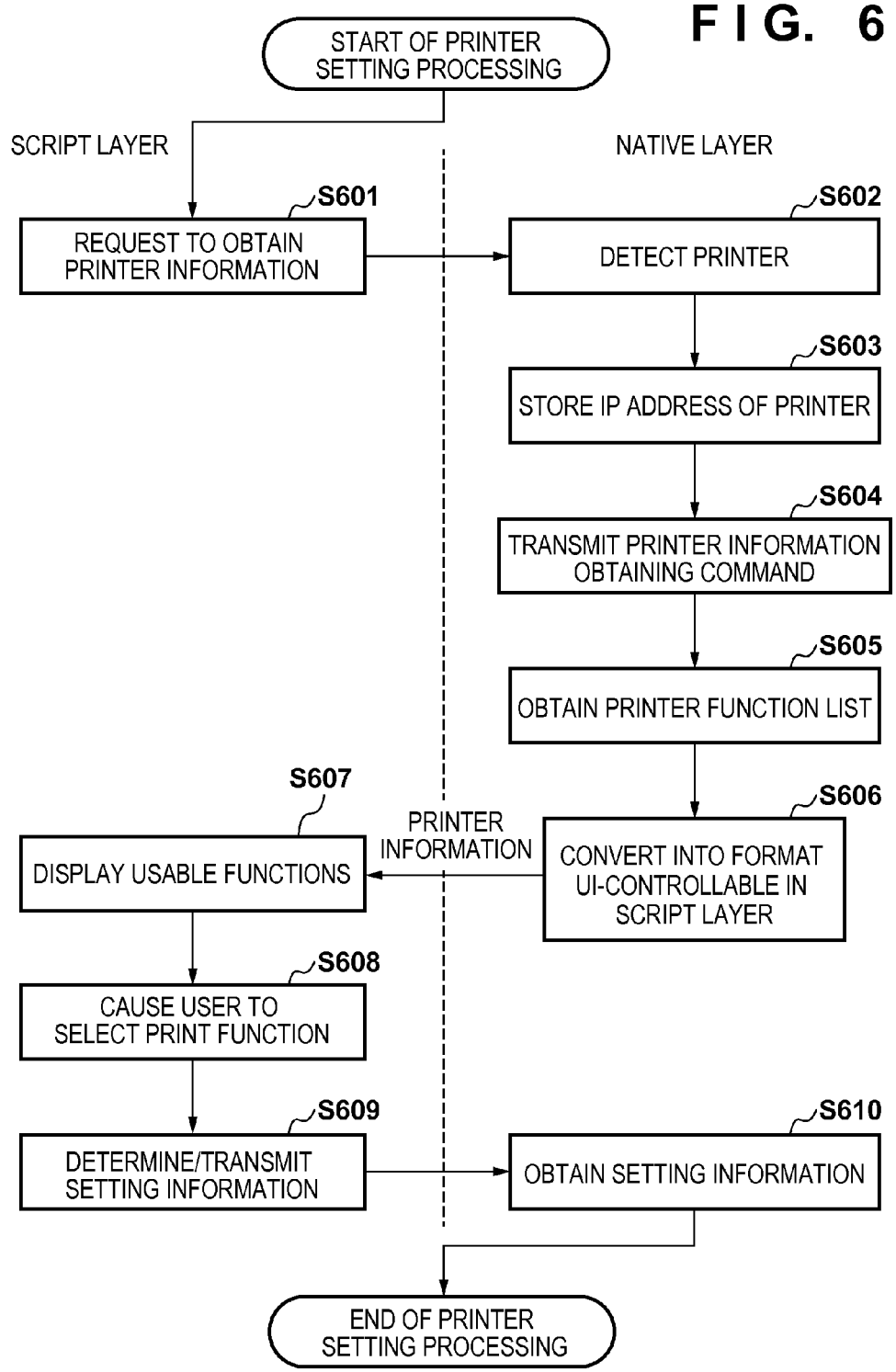
FIG. 6 is a flowchart illustrating details of printer setting processing.

Referring to FIG. 6, a command is generated in the native layer 218. However, even if a command is generated in the script layer 217, it is possible to obtain the same effects. In this case, for example, a command including the above instruction sentence in the XML format is created in the script layer 217, and transferred to the native layer 218. Upon receiving the instruction sentence, the native layer 218 transmits the command to the printer 112 in a format complying with a communication protocol.

Upon receiving the command from the information processing apparatus 115, the printer 112 transmits the printer information as device information in the XML format to the information processing apparatus 115 according to the communication protocol. An example of the printer information is given by:

```
01:        <?xml version="1.0" encoding="utf-8" ?>
02:        <cmd xmlns:trans="http://www.xxxx/yyyyy/">
03:            <contents>
04:                <device id="Printer001" />
05:                <mode = 1>
06:                    <media>GlossyPaper</media>
07:                    <size>A4</size>
08:                    <quality>1</quality>
09:                    <border>no</border>
10:                </mode>
11:                <mode = 2>
                   ...
                   </mode>
                   <mode = 3>
                   ...
                   </mode>
                   ...
            </contents>
        </cmd>
```
---

The first line indicates a header representing that the information is described in the XML format. On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>. The fourth line indicates a device ID. In this example, the model name of the printer 112 is "Printer001". On the fifth line and subsequent lines, the respective modes of the printer 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 11th line and subsequent lines, information about mode 2 as another mode is described. In this way, the model name of the printer 112 and all the modes supported by the printer are described in the XML data. Note that a method of describing printer information is not limited to this. The printer information may be described in another format such as a binary format or a text format which is not a tag format. In the above example, the information of the print function of the printer is transferred. However, the present invention is not limited to this. For example, information about image processing and analysis processing processable by the printer, the presence/absence of a silent print mode, the presence/absence of the use of a memory card, and a status such as the remaining ink amount may be transferred. Examples of image processing are color conversion such as monochrome conversion, sepia conversion, and chroma enhancement, multiple image layout, white balance correction, noise reduction, and processing of automatically correcting a photo to desirable colors and brightness.

In step S605, the CPU 100 receives the printer information from the printer 112. In the native layer, the CPU 100 obtains, from the received printer information, a printer function list including terms of the type and size of printing paper, the print quality, and bordered/borderless and a term count in each of all the modes of the printer 112.

In step S606, the CPU 100 converts the received printer information into a format interpretable in the script layer 217, and transmits the converted information to the script layer 217. That is, the CPU 100 transfers the information obtained by communication with the printer 112 to the script layer 217. More specifically, the CPU 100 transmits the printer information in the XML format just as it has been received or transmits the printer information after converted into a text format without tag. Every time a specific native function is invoked from the script layer 217, information may be obtained as its return value. Alternatively, a mode to be obtained or the like may be given to the native function as an argument, and information may be obtains as its return value. In addition, the information may be transferred by using the above-described JSON character string, or transferred by a character string such as base64 by using the data conversion units 207 and 203.

In step S607, the CPU 100 forms a setting screen (FIG. 10) including functions usable by the printer 112 based on the printer information received from the native layer 218, and displays the setting screen. Note that a printer selection method is not limited to this, and a method of selecting a printer which responds earliest, a method of selecting a printer having more functions, a method of selecting a printer with not so many print jobs, or the like may be used.

As described above, the CPU 100 displays the setting screen 1001 (FIG. 10) for prompting the user to select functions usable by the printer, such as the type and size of printing paper, the print quality, and bordered/borderless. As an example of a method of forming a setting screen, a sample of an HTML description is given by:

```
<!DOCTYPE html>
    <head>
        <title>print setting</title>
        <script>
            <!-- paper size -->
            var PaperSizeNum = GetPaperSizeNum( );
            var p = document.getElementById("PaperList");
            var i;
            for(i=0; i<PaperSizeNum; i++){
                p.options[i] = new Option(GetPaperSize(i),
GetPaperSize(i));
            }
            <!-- paper type -->
            var MediaTypeNum = GetMediaTypeNum( );
            var m = document.getElementById("MediaList");
            var j;
            for(j=0; j<MediaTypeNum; j++){
                m.options[i] = new Option(GetMediaTypeT(j),
GetMediaTypeV(j));
            }
            <!-- print quality -->
            var QualityNum = GetQualityNum( );
            var q = document.getElementById("QualityList");
            var k;
            for(k=0; k< QualityNum; k++){
                q.options[i] = new Option(GetQualityT(k),
GetQualityV(k));
            }
            <!-- bordered/borderless -->
            var BorderNum = GetBorderNum( );
            var b = document.getElementById("BorderList");
            var l;
            for(l=0; l<BorderNum; l++){
                b.options[i] = new Option(GetBorderT(l),
GetBorderV(l));
            }
            <!-- print function -->
            function printer( ) {
    SetPrint(document.getElementById("PaperList").value,
            document.getElementById("MediaList").value,
            document.getElementById("QualityList").value,
            document.getElementById("BorderList").value);
            }
        </script>
    </head>
        <!-- display unit -->
        <body>
            paper size <select id="PaperList"></select><br/>
            paper type <select id="MediaList"></select><br/>
            print quality <select
id="QualityList"></select><br/>
            bordered/borderless <select
id="BorderList"></select><br/>
            <br/>
            <button id="btn1" onclick="printer( )">setting
completion</button>
        </body>
</html>
```

In the above sample, GetPaperSizeNum( ), GetMediaTypeNum( ), GetQualityNum( ), and GetBorderNum( ) are native functions, and each native function has a function of obtaining an item count. For example, paper sizes supported by the printer are A4, A5, B5, and L size, GetPaperSizeNum( ) returns 4.

Also, GetPaperSizeT(n), GetMediaTypeT(n), GetQualityT(n), and GetBorderT(n) are native functions, and each function returns the nth character string corresponding to the argument n. For example, the return value of GetPaperSize (0) as a function of returning text of the paper size is "A4", and the return value of GetPaperSize(1) is "A5". These values are extracted by the native function from the printer information received from the printer.

GetPaperSizeV(n), GetMediaTypeV(n), GetQualityV(n), and GetBorderV(n) are also native functions, and each function returns the nth value corresponding to the argument n. For example, the return value of GetMediaTypeT(0) as a function of returning text of the paper type uses words, for example, "glossy paper" to be displayed and presented to the user. On the other hand, the return value of GetPaperTypeV (0) uses words, for example, "GlossyPaper" interpretable by a printer. These words are determined in the native layer in association with the information sent from the printer. For example, if a value extracted from information sent from the printer is "GlossyPaper", the text to be displayed is determined as "glossy paper". As a determination method, the native layer holds a correspondence table in advance and determines texts based on the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set, as a matter of course. Furthermore, not only the print function but also information about image processing and analysis processing processable by the printer, the presence/absence of a silent mode, the presence/absence of the use of a memory card, and a status such as the remaining ink amount may be displayed.

Figure 10:
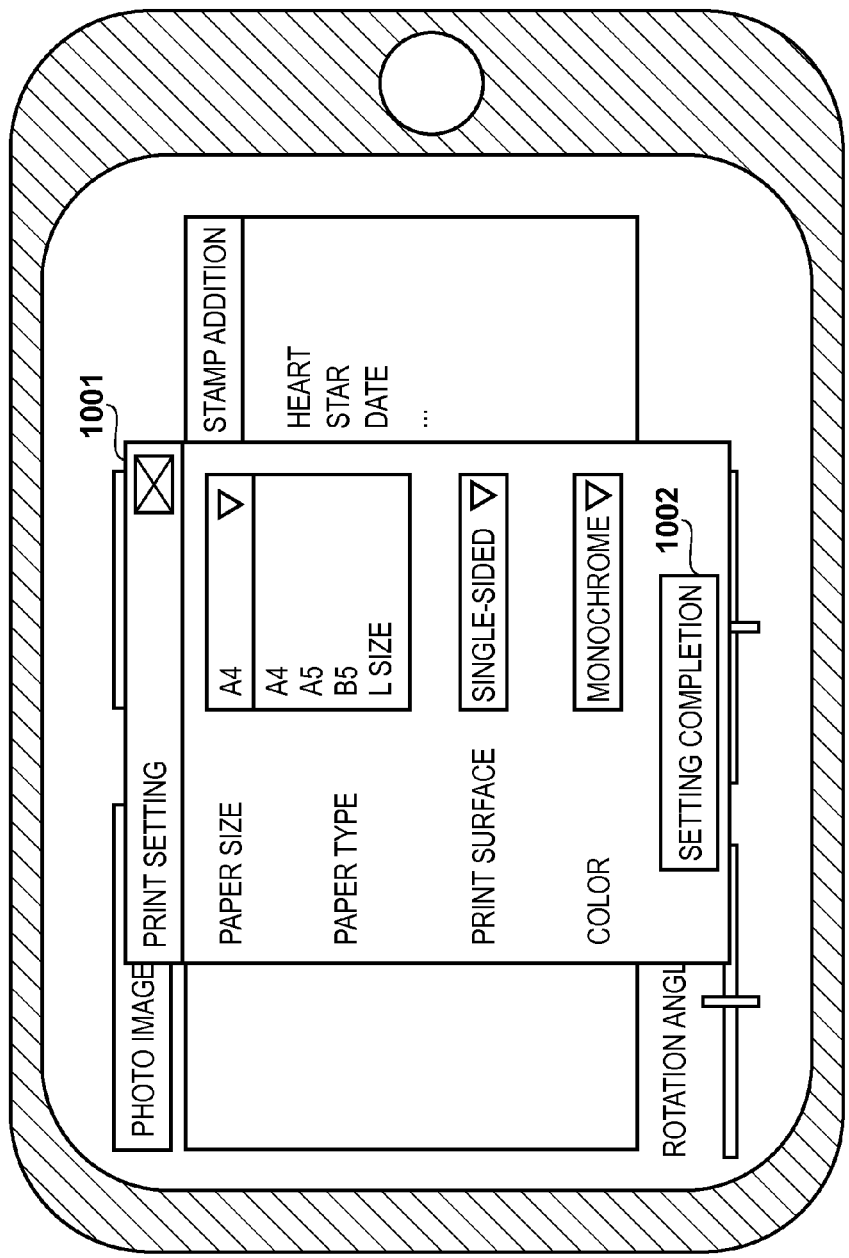
FIG. 10 is a view showing an example of a setting screen.

In step S608, in the script layer 217, the CPU 100 selects a function to be set in the printer based on a user operation on the setting screen 1001. The setting screen 1001 shown in FIG. 10 is an example in which the HTML of the above example is displayed on the display 104 using the rendering unit 216. The printer information is requested via the native layer 218, thereby forming the setting screen 1001 based on the information obtained from the printer information by using the above native function. Note that the HTML can be formed either in the script layer 217 or in the native layer 218.

Furthermore, each setting item such as the paper size shown in FIG. 10 is provided as a pull-down menu, and each item can be selected by a user operation. The setting screen 1001 indicates a state in which a list of selectable items is displayed as a setting item of a paper size by a pull-down menu, and a paper size such as A4 or A5 can be selected by a user operation.

In step S609, upon detecting a user operation on the setting completion button 1002, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer the paper size, paper type, print quality, and bordered/borderless settings as a character string to the native layer 218.

In step S610, the CPU 100 receives the setting information from the script layer 217 by the binding function. In the native layer 218, a print command is generated later based on the received setting information, print target image data, and the image data of the stamp according to the communication protocol of the printer 112. The print command is transmitted to the printer 112 via the printer communication unit 213.

<Details of Rendering Processing>

When the user presses the setting completion button 1002 of the setting screen 1001 shown in FIG. 10, rendering processing in step S24 of FIG. 3 starts. To perform print processing, it is necessary to convert print content described in SVG into image data having a print resolution specific to the printer. This conversion processing is called rendering. In this embodiment, rendering processing for printing is executed by the interpreter 214. In this way, both rendering for display and that for printing are executed by the same interpreter. This is a vital issue for matching both renderings.

Details of the rendering processing in step S24 of FIG. 3 will be described with reference to FIG. 7. Note that steps S701 to S705 and S708 to S709 are processes executed by the CPU 100 using the program of the script layer 217, and steps S706 to S707 are processes executed by the CPU 100 using the interpreter 214 of the OS layer 219.

In step S701, the CPU 100 activates an indicator. The indicator is a UI (User Interface) display representing that some processing is in progress in the application. An example of the indicator is a progress bar. Since the rendering processing normally takes a time of several seconds to several tens of seconds, displaying such an indicator is essential.

In step S702, the CPU 100 calculates resolution information necessary for rendering from the paper type information selected by the user in step S608 and the value of "ResolutionX" and the value of "ResolutionY" obtained by "GetInformation". For example, in this application, the script layer 217 holds the following correspondence table.

TABLE 1

| Paper size | PaperH [mm] | PaperW [mm] |
|---|---|---|
| 4 × 6 | 101.6 | 152.4 |
| A4 | 297 | 210 |
| L size | 89 | 127 |

In Table 1, PaperH represents the paper height, and PaperW represents the paper width. Pieces of resolution information ResX and ResY (the unit is "pixels") necessary for rendering can be calculated by $$ResX = PaperH/25.4 \times ResolutionX$$

$$ResY = PaperW/25.4 \times ResolutionY$$

In step S703, the enlargement ratio of the SVG content is calculated based on the resolution information. The enlargement ratio (ExpX, ExpY) is calculated by the following formulas. That is, the enlargement ratio is calculated using $$ExpX = ResX/SvgX$$

$$ExpY = ResY/SvgY$$

In the above equations, according to the above-described SVG content, SvgX=1600, and SvgY=1200.

After calculation of the enlargement ratio, using the value, the CPU 100 converts the drawing command of the SVG script describing an extension instruction into a Canvas instruction, and describes the content in a Canvas area in step S704. The SVG script (image instruction of SVG) describing the content is as follows. Note that the processing in step S704 is implemented when the CPU 100 uses the conversion unit 2000 of the script layer.

```
<?xml version="1.0" standalone="no" ?>
<!DOCTYPE svg PUBLIC "-//W3C//DTD SVG 20010904//EN"
"http://www.w3.org/TR/2001/REC-SVG-
20010904/DTD/svg10.dtd">
<svg width="1600" height="1200"
xmlns="http://www.w3.org/2000/svg"
xmlns:xlink="http://www.w3.org/1999/xlink">
<image id="img01" xlink:href ="/images/IMG_0001.JPG"
x="10" y="10" width="780" height="1180"/>
<image id="img02" xlink:href ="/images/IMG_0002.JPG"
x="810" y="10" width="780" height="1180"/>
</svg>
```

In the above example, two image elements of SVG are included in the print content. At this time, in this embodiment, the following function of JavaScript corresponding to the two image elements of SVG is prepared, and the image instruction of SVG is replaced with a Canvas instruction.

```
function drawSVGImage( imageID, ctx , ExpX, ExpY) {
    var image = document.getElementById(imageID);
    var x        = image.getAttribute("x")
    var y        = image.getAttribute("y")
    var width              = image.getAttribute("width");
    var height             = image.getAttribute("height");
    var href               = image.getAttribute("xlink:href")
    img = new Image( );
    img.src = href ;
    ctx.drawImage(img, 0,0,width, height,
        x*ExpX, y*ExpY, width*ExpX, height*ExpY);
}
```

The above function obtains the arrangement position or arrangement size of an image using the "getAttribute" function. In this example, the path information of the image is set in an image element for Canvas, and the image is drawn using the "drawImage" function of context ctx of Canvas. In the argument of "drawImage", the position and region of image data to be drawn are enlarged using the enlargement ratio (Expx, ExpY) calculated in step S703. Note that ctx of Canvas is reserved in advance in the magnitude of necessary resolutions ResX and ResY. In this embodiment, since two images exist, "img01" and "img02" are set in "imageID". In step S705, the above function is invoked twice.

Drawing information by Canvas described in step S704 is input to the interpreter 214 held by the OS layer 219, and the interpreter 214 actually performs rendering processing.

Hence, in step S705, the CPU 100 invokes a rendering function to cause the OS layer 219 to execute the rendering processing.

In step S706, the CPU 100 reserves a memory area to draw the image in the interpreter 214. The size of the memory area is as large as the size of ctx of Canvas. In step S707, the CPU 100 performs rendering processing for the drawing information described in Canvas using the interpreter 214. Image data obtained by the rendering processing is stored in the memory area reserved in step S706.

In step S708, the CPU 100 obtains the image data generated by the rendering processing in step S707. In step S709, the CPU 100 stops the indicator. Note that the image data saved in the memory in step S707 is obtained as image data using the "toDataURL" function of Canvas. Since the data array of an RGB image cannot be used intact in the script layer 217, the image data is converted into a format (that is, base64 format) interpretable in the script layer 217. Hence, the image data obtained in step S708 is image data in the base64 format. With the above-described processing, the drawing content originally described in SVG is re-drawn once using a Canvas instruction. This allows the script layer to obtain the rendering result of the interpreter of the OS layer as image data.

Note that in this embodiment, for the sake of simplicity, only the image element of SVG has been described. However, the present invention is not limited to this. There exist many other instructions as drawing instructions of SVG, for example, a rectangle drawing instruction "rect", a circle drawing instruction "circle", a line drawing instruction "line", and a text drawing instruction "text". Hence, when drawing functions by Canvas corresponding to these drawing instructions are prepared, all instructions described in SVG can be replaced with Canvas instructions, like the image elements.

When the rendering processing has succeeded, the CPU 100 transmits an indicator stop request to the script layer 217 in step S708. In step S709, the CPU 100 stops the indicator and removes it from the display 104.

<Details of Print Processing>

Print processing is executed in step S25 of FIG. 3 using the rendered image data. In fact, the process of step S25 starts when the process of step S707 of FIG. 7 ends, and the script layer transmits the image data obtained in step S708 to the native layer. Details of the print processing in step S25 of FIG. 3 will be described with reference to FIG. 8. Note that steps S801 to S803 shown in FIG. 8 are processes executed by the CPU 100 using the program of the native layer 218, and step S804 is a process executed on the printer side.

In step S801, the CPU 100 converts the image data transmitted from the script layer to the native layer into a format usable by the printer 112. Formats usable by the printer include not only RGB, JPEG, and CMYK but also an original format of a printer vendor such as PDF. Any of these formats can be used here.

In step S802, the CPU 100 generates a command to be transmitted to the printer 112 based on the setting information and the image data converted in step S801. In step S803, the CPU 100 uses the printer communication unit 213 to transmit the command generated in step S802 to the printer 112 corresponding to the IP address stored in step S603 in accordance with the communication protocol usable by the printer.

In step S804, the printer 112 executes printing according to the command received from the information processing apparatus 115.

Hence, according to the above-described embodiment, even though print content is described in the first content description language (for example, SVG format), rendering processing can be performed by converting the content information into the second content description language (for example, Canvas format). Image data drawn in the second description language can be obtained as, for example, RGB component values. The RGB image data is converted into a predetermined format usable by the printer and transmitted to the printer. This makes it possible to build a print application.

Another Embodiment

In the above-described embodiment, an example in which the path information of an image instructed to be drawn in SVG is set in img.src of Canvas and drawn in the context of Canvas has been explained. An example in which an image element of SVG is drawn in Canvas using a JavaScript function will be described.

For the description, the following JavaScript function will be exemplified.

```
function drawSVGImage ( imageID, ctx , ExpX, ExpY) {
  var image = document.getElementById(imageID);
  var x         = image.getAttribute("x")
  var y         = image.getAttribute("y")
  var width         = image.getAttribute("width");
  var height        = image.getAttribute("height");
  var href      = image.getAttribute("xlink:href")
  img = new Image( );
  img.src = getBase64Data( href );
  ctx.drawImage(img, 0,0,width, height,
  x*ExpX, y*ExpY, width*ExpX, height*ExpY);
  }
```

In the above program code, information to be set in img.src is obtained by a uniquely defined "getBase64Data (href)" function. This function indicates a function to open, in the native layer, image data represented by path information designated by "href", convert rasterized RGB pixel values into the base64 format, and obtain the image data in the script layer. This function is prepared in the native layer and can be invoked from the script layer by the above-described JavaScript and the binding function of the native layer.

As described above, in this embodiment, an arrangement is employed in which information converted into the base64 format is drawn in Canvas in the native layer, instead of opening image data by designating a file. This can attain the following effects.

That is, in Canvas, when a method of directly drawing image data from path information is used, the image data as the drawing result cannot be obtained later using the "toDataURL" function depending on a specific OS. This problem is called a contamination problem of Canvas. On the other hand, according to the above-described embodiment, image data converted into the base64 format is obtained in the native layer and pasted in Canvas only when rendering the image. It is therefore possible to avoid the contamination problem and obtain the image data as the rendering result from the interpreter.

Still Another Embodiment

In the above-described embodiments, an example has been explained in which a context (ctx) of Canvas according to resolution information after enlargement is generated, and when drawing SVG content in Canvas, the SVG content is drawn by multiplying the position or size information of the image by the enlargement ratio. However, the present invention is not limited to this. For example, SVG data itself is directly replaced with a Canvas instruction without being enlarged to the print resolution. This is because the Canvas drawing instruction also includes a content extension instruction "scale", and the data can be enlarged to an intended resolution (ResX, ResY) in accordance with the scale instruction of Canvas.

Figure 7:
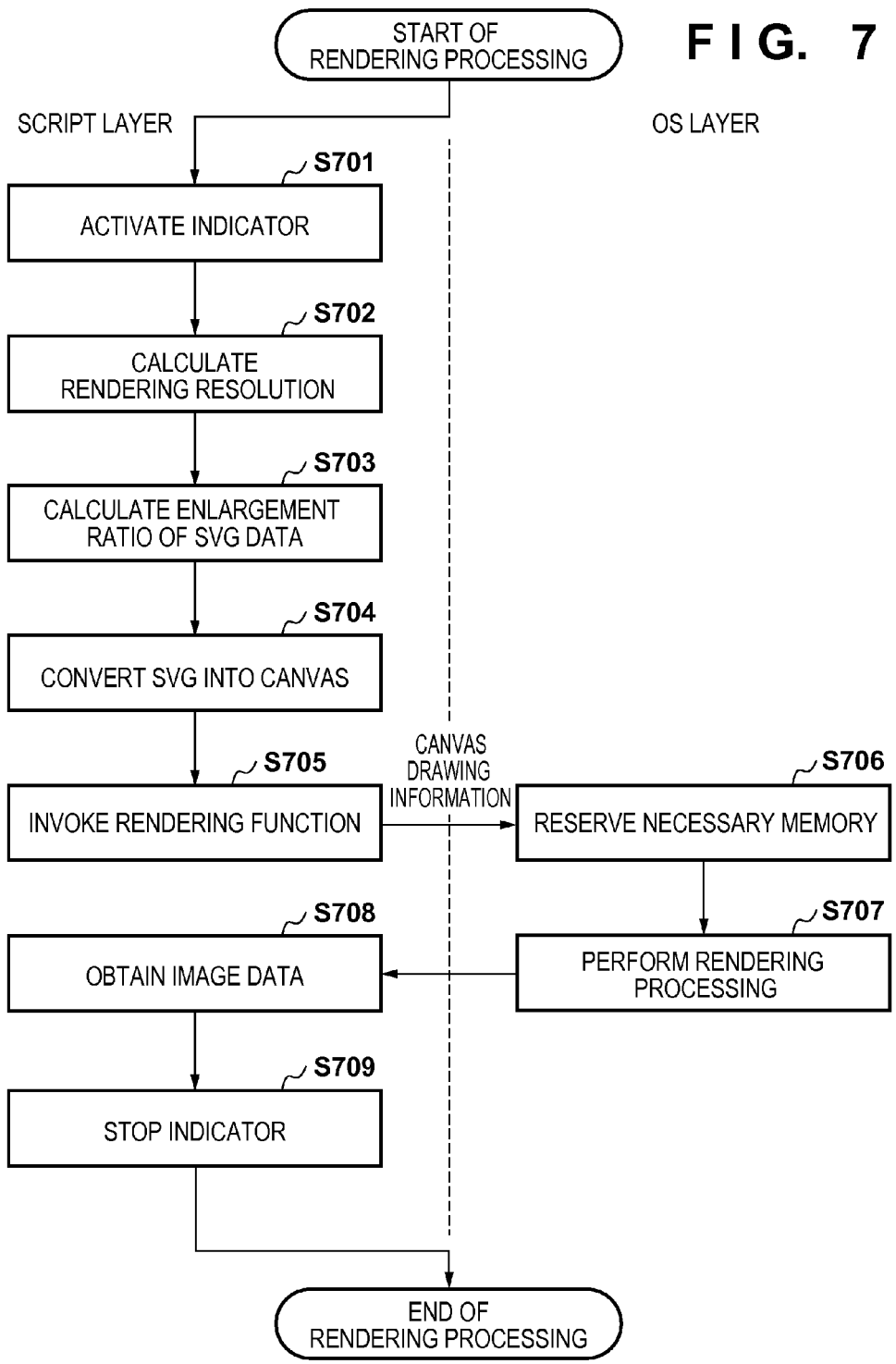
FIG. 7 is a flowchart illustrating details of rendering processing.
Figure 8:
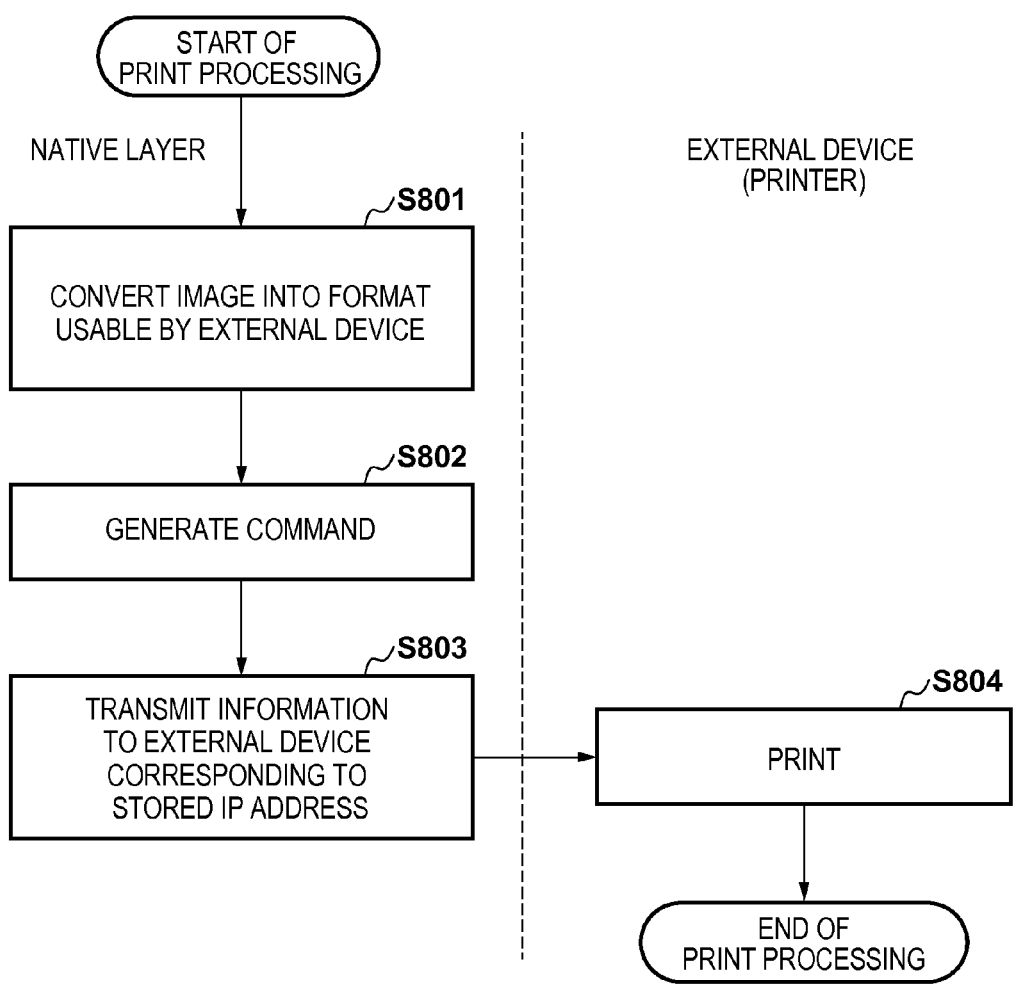
FIG. 8 is a flowchart illustrating details of print processing.

More specifically, in step S704 of FIG. 7, after an SVG script is drawn in accordance with a Canvas instruction, the context (ctx) is enlarged using the scale instruction included in the context of Canvas. More specifically, this is described as follows. ctx.scale (ExpX, ExpY);

Here, ExpX and ExpY represent the enlargement ratio, as described above. The Canvas script including the extension instruction is input to an interpreter 214 in step S705. The interpreter 214 obtains image data (RGB values) of the rendering result, as described above.

In the above-described embodiments, the printer is selected after the application is activated. However, the present invention is not limited to this. For example, printer setting may be done in the process of doing print settings, and an information obtaining command by XML may be transmitted to the printer.

In the above-described embodiments, an example in which only one interpreter configured to interpret/execute an instruction of the script layer is used has been explained. However, the present invention is not limited to this. For example, although the interpreter 214 is used to do display on the display, another interpreter may separately be provided in the native layer for image rendering, and a drawing instruction may be interpreted using this interpreter.

The codes described in the above embodiments are merely pseudo codes. Hence, they may be executed in another form using a known language such as HTML5, SVG, or JavaScript.

In the above-described embodiments, an example in which the first content description language is SVG, and the second content description language is Canvas has been explained. However, the first description language is not limited to SVG, as a matter of course. For example, another original technical language by XML similar to SVG may be used. In this case, each drawing instruction is converted into Canvas, as in the above-described embodiments, thereby achieving the objective of the present invention.

In the above-described embodiments, an example in which only two content description languages are handled has been explained. However, the present invention is not limited to this, and rendering processing may be executed via three or more content description languages. For example, even though an arrangement for temporarily converting content originally described in SVG into another form and further converting it into the Canvas format is used, the present invention is still implemented, as a matter of course.

In the above-described embodiments, an example in which image data after rendering is converted into a predetermined format and transmitted to the printer has been explained. However, the present invention is not limited to this. For example, image data after rendering may be converted into a general-purpose format (for example, JPEG) and saved in the information processing apparatus on which the program operates. The image data in the general-purpose format may be transmitted to another server connected via the network 113, for example, a server that builds a social network. As described above, image data obtained after rendering can be used for any other application purpose, and the arrangement falls within the scope of the present invention, as a matter of course.

The example of the information processing apparatus shown in FIG. 1 is hardware assuming a portable mobile computer. However, the present invention is not limited to this. For example, the same arrangement as described above can be implemented on hardware such as a desktop type personal computer or game machine.

In the above-described embodiments, only print content including two photos arranged side by side has been exemplified. However, the present invention is not limited to this. Those who are skilled in this art can implement a description to, for example, superimpose image content other than a photo or text information such as a date on a photo, as a matter of course. As described above, drawing content other than a photo will also fall within the scope of the present invention.

The pieces of information shown in Table 1 may be held in the application in advance, or included in the printer main body and obtained by a "GetInformation" command. Alternatively, the information may be held in the server 114 as shown in FIG. 1, and the information as shown in Table 1 may be obtained from the server in accordance with the standard communication protocol of the web when the print application is activated.

In addition, as the printer according to each of the aforementioned embodiments, an inkjet printer, a laser printer, a dye-sublimation printer, a dot impact printer, or the like can be used. These printers may be so-called multifunction peripherals having not a single function but the printer function, the scanner function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135178, filed Jun. 30, 2014, which is hereby incorporated by reference herein in its entirety.

What is claimed is:

1. An information processing apparatus for executing, by a processor, a program including a first program layer with an instruction set to be interpreted and executed by the processor and a second program layer with an instruction set interpreted in advance by a unit other than the processor, comprising:
 a conversion unit configured to convert content described in a first description language, by which a drawing result is not obtainable from an operating system (OS), into content in a second description language, by which the drawing result is obtainable from the OS, in the first program layer;
 an instruction unit configured to cause the OS to draw the content in the second description language;
 an obtaining unit configured to obtain, from the OS, data of the content obtained by drawing the content in the second description language; and
 a print instruction unit configured to issue a print instruction to perform a printing operation using a printer connected to the information processing apparatus, based on the data of the content obtained by said obtaining unit,
 wherein at least one of said conversion unit, said instruction unit, said obtaining unit and said print instruction unit is implemented using the processor and a memory.

2. The apparatus according to claim 1, wherein the content is print content, and said conversion unit includes:
 a calculation unit configured to calculate an enlargement ratio of the print content described in the first description language, based on a print resolution of the printer for printing the print content; and
 a first conversion unit configured to convert the print content in the first description language, into print content in the second description language based on the enlargement ratio calculated by said calculation unit.

3. The apparatus according to claim 2, wherein the print resolution is calculated based on attribute information obtained from the printer connected to the information processing apparatus.

4. The apparatus according to claim 1, further comprising:
 a second conversion unit configured to convert image data of the content obtained by said obtaining unit into image data in a format usable by the printer; and
 a transmission unit configured to transmit the image data in the format usable by the printer, converted by said second conversion unit, to the printer.

5. The apparatus according to claim 1, wherein the content in the second description language is translated by a translation unit provided in the OS operated by the information processing apparatus.

6. The apparatus according to claim 5, wherein another translation unit configured to translate the content is provided in the second program layer.

7. The apparatus according to claim 1, wherein the first description language is SVG, and
 the second description language is Canvas.

8. The apparatus according to claim 1, wherein the first program layer includes one of HTML5 and JavaScript®.

9. A processing method of an information processing apparatus for executing, by a processor, a program including a first program layer with an instruction set to be interpreted and executed by the processor and a second program layer with an instruction set interpreted in advance by a unit other than the processor, comprising:
 converting content described in a first description language, by which a drawing result is not obtainable from an operating system (OS), into content in a second description language, by which the drawing result is obtainable from the OS, in the first program layer;
 causing the OS to draw the content in the second description language;
 obtaining, from the OS, data of the content obtained by drawing the content in the second description language; and
 issuing a print instruction to perform a printing operation using a printer connected to the information processing apparatus, based on the obtained data of the content.

10. The method according to claim 9, wherein the content is print content, and the converting includes:
 calculating an enlargement ratio of the print content described in the first description language based on a print resolution of the printer for printing the print content; and
 converting the print content in the first description language into print content in the second description language based on the calculated enlargement ratio.

11. The method according to claim 10, wherein the print resolution is calculated based on attribute information obtained from the printer connected to the information processing apparatus.

12. The method according to claim 9, further comprising:
 converting image data of the obtained content into image data in a format usable by the printer; and
 transmitting the converted image data in the format usable by the printer to the printer.

13. The method according to claim 9, wherein the content in the second description language is translated by a translation function provided in the OS operated by the information processing apparatus.

14. The method according to claim 13, wherein another translation function of translating the content is provided in the second program layer.

15. The method according to claim 9, wherein the first description language is SVG, and
 the second description language is Canvas.

16. The method according to claim 9, wherein the first program layer includes one of HTML5 and JavaScript®.

17. A non-transitory computer-readable storage medium which stores a computer program to be executed in a processor of an information processing apparatus, wherein the program includes a first program layer with an instruction set to be interpreted and executed by the processor and a second program layer with an instruction set interpreted in advance by a unit other than the processor, which, when run on the processor, causes the processor to execute a processing method of the information processing apparatus, the method comprising:
 converting content described in a first description language, by which a drawing result is not obtainable from an operating system (OS), into content in a second description language, by which the drawing result is obtainable from the OS, in the first program layer,
 causing the OS to draw the content in the second description language;
 obtaining, from the OS, data of the content obtained by drawing the content in the second description language; and issuing a print instruction to perform a printing operation using a printer connected to the information processing apparatus, based on the obtained data of the content.

18. The apparatus according to claim 1, wherein the drawing result of the content described in the first description language is displayable, but the data of the content is not obtainable.

19. The method according to claim 9, wherein the drawing result of the content described in the first description language is displayable, but the data of the content is not obtainable.

* * * * *